(12) United States Patent
Brizio

(10) Patent No.: US 9,259,117 B2
(45) Date of Patent: Feb. 16, 2016

(54) CAN FOR THE EXTEMPORANEOUS PREPARATION OF BEVERAGES BY EXTRACTION AND/OR INFUSION, PROVIDED WITH A SAFETY LID

(76) Inventor: Adriana Brizio, Ruvigliana (CH)

( * ) Notice: Subject to any disclaimer, the term of this patent is extended or adjusted under 35 U.S.C. 154(b) by 425 days.

(21) Appl. No.: 12/990,948

(22) PCT Filed: Sep. 19, 2008

(86) PCT No.: PCT/EP2008/062511
§ 371 (c)(1),
(2), (4) Date: Nov. 4, 2010

(87) PCT Pub. No.: WO2010/031440
PCT Pub. Date: Mar. 25, 2010

(65) Prior Publication Data
US 2011/0056944 A1    Mar. 10, 2011

(51) Int. Cl.
*B65D 17/34* (2006.01)
*A47J 31/30* (2006.01)

(52) U.S. Cl.
CPC ..................................... *A47J 31/303* (2013.01)

(58) Field of Classification Search
USPC ......... 220/275, 276, 271, 265, 266, 268, 269,
220/255.1, 258.3, 258.2, 254.1, 203.01,
220/203.08
See application file for complete search history.

(56) References Cited

U.S. PATENT DOCUMENTS

| | | | | |
|---|---|---|---|---|
| 3,163,317 A | * | 12/1964 | Biedenstein et al. | ......... 220/270 |
| 3,485,410 A | * | 12/1969 | Boik | ............................. 220/271 |
| 4,167,899 A | | 9/1979 | McCormick | |
| 4,928,844 A | * | 5/1990 | LaBarge | ................... 220/203.08 |
| 5,054,642 A | * | 10/1991 | Yoshida | ......................... 220/276 |
| 5,104,666 A | | 4/1992 | Sanvitale | |
| 6,026,733 A | | 2/2000 | Orrico et al. | |
| 6,851,568 B2 | * | 2/2005 | Herrmann | ...................... 220/270 |
| 2005/0109213 A1 | | 5/2005 | Terada | |
| 2006/0165851 A1 | * | 7/2006 | Brizio | ........................... 426/106 |
| 2008/0314254 A1 | | 12/2008 | Terada | |

\* cited by examiner

FOREIGN PATENT DOCUMENTS

| | | |
|---|---|---|
| EP | 0 112 086 | 6/1984 |
| EP | 0 344 541 | 12/1989 |
| EP | 1 610 657 | 1/2006 |

OTHER PUBLICATIONS

International Search Report issued Apr. 17, 2009 in PCT/EP08/62511 filed Sep. 19, 2008.

*Primary Examiner* — Jeffrey Allen
(74) *Attorney, Agent, or Firm* — Oblon, McClelland, Maier & Neustadt, L.L.P.

(57) ABSTRACT

A can for extemporaneous preparation of beverages by extraction and/or infusion including a first chamber configured to collect a final beverage, a second chamber containing a drinkable liquid, and a filtering device containing a substance to produce the required beverage by extraction and/or infusion. The can is configured to be put onto a heating source after opening the can lid and operating the filtering device by the user. The lid includes: an outer rim portion configured to remain fixed to the can lateral wall when opening the can; an inner removable portion configured to be ripped to open the can; and a predetermined breaking line separating the inner removable portion from the outer rim portion. The breaking line is provided in an annular portion forming part of the lid and made of plastic material. The outer part of the annular portion part of the outer rim portion while the inner part thereof is part of the inner removable portion.

2 Claims, 4 Drawing Sheets

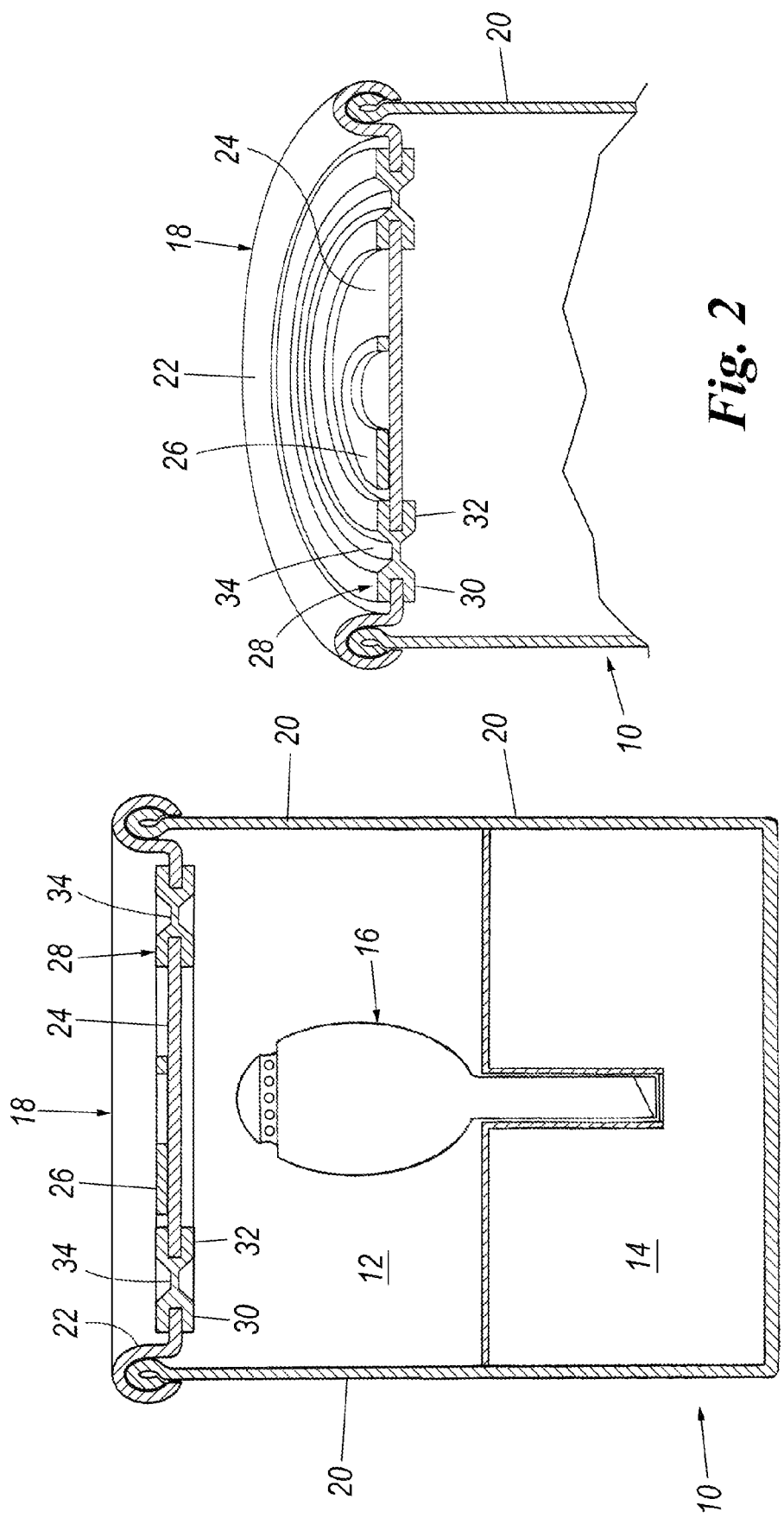

CAN FOR THE EXTEMPORANEOUS PREPARATION OF BEVERAGES BY EXTRACTION AND/OR INFUSION, PROVIDED WITH A SAFETY LID

The present invention relates to a can usable for the extemporaneous preparation of beverages by extraction and/or infusion( ).

Cans for the extemporaneous preparation of beverages by extraction and/or infusion are disclosed in EP-A-1610657 and have been recently launched on the market. Said cans have a first chamber intended to collect the final beverage, a second chamber containing a drinkable liquid and a filtering device containing a substance able to produce the required beverage by extraction and/or infusion. The first chamber is closed by the can lid.

Said cans are foreseen to be put onto a heating source after opening the lid and operating the filter by the user. To this purpose, the lid has an outer rim portion, intended to remain fixed to the can vertical wall when opening the can, and an inner removable portion, intended to be ripped by pulling a tab, provided on the lid, in order to open the can, a groove being provided between said inner and outer portions to reduce the thickness and consequently the resistance of the lid structure, so as to enable the hand-ripping of the aforesaid inner portion.

The user, therefore, will pull the tab to partially or totally rip the lid and slip a hand into the can to move the filter device in a given direction, thereby putting the liquid contained in the second chamber in contact with the substance contained in the filtering device.

Upon completion of the aforementioned operations, the user will put the can onto a heating source. In this way, by effect of the pressure increase due to heating, the liquid will be forced to move from the second chamber to the first chamber passing through the substance contained in the filter device and forming an extemporaneously prepared beverage.

This quite new kind of cans has remarkable risks as far as safety is concerned, some risks being in common with the traditional cans, while others being connected to the specific use of the more recent cans above described An incommensurable number of traditional cans, containing conserved food or ready-to-drink beverages, are currently offered on the market. They all are provided with a usual lid which is seamed to the can vertical wall, the lid having an outer rim portion, intended to remain fixed to the can vertical wall when opening the can, and an inner removable portion, intended to be ripped by pulling a tab, in order to open the can, a groove being provided between said inner and outer portions so as to enable the hand-ripping of the aforesaid inner portion.

The most important disadvantage of the aforesaid traditional cans is that, once the inner portion of the lid has been ripped up, the rim portion which remains attached to the vertical can wall, as well as the removed portion, will have sharp edges, so that there is a serious risk of cutting when the user is handling the can to reach the food or beverage contained therein, or when disposing said can. So far, no effective solution to this problem has been found, in spite of the huge value of the involved market branch. Some countries are nowadays planning to pass a rule establishing that the lid removable portion can be pushed only inside the can and cannot be pulled outwards. Thus, the problem of ensuring safety when the user inserts her/his hand into the can, whether just by mistake or for reaching the food contained therein, as well as when the user is bringing the can to her/his mouth, is not overcome.

At the same time another remarkable problem connected to the specific use of the more recent cans above described, is that the can is foreseen to be put onto a heating source to form an extemporaneous beverage. It may happen that the user inadvertently puts the can onto the heating source without having previously opened the can lid. In this case, because of the inside liquid transforming into steam, the pressure inside the can may reach very high values, such as to cause the blast of the can. The traditional safety means for discharging the inner pressure, as the known exhausting valves which are usually provided onto the lateral walls of those containers which have the risk of inner overpressure (e.g. moka coffeemakers or pressure cookers), do not comply with the requirements of easy handling, safe packaging and reduced costs, which occur in cans destined to the large-scale distribution.

The present invention aims to solve the problem of ensuring safety when manipulating the lid, as well as to prevent the can from blasting.

According to the present invention, the first problem is solved by a can for the extemporaneous preparation of beverages by extraction and/or infusion, the can being provided with a lid which is seamed to the lateral can wall, the lid comprising: an outer rim portion intended to remain fixed to the can lateral wall when opening the can, an inner removable portion intended to be ripped in order to open the can, and a predetermined breaking line separating said inner removable portion from said outer rim portion; characterized in that said breaking line is provided in an annular portion forming part of the lid and made of plastic material, the outer part of the annular portion being part of said outer rim portion, while the inner part of the annular portion being part of said inner removable portion. Therefore, when the inner removable portion of the lid is ripped, since the inner edge of the outer rim portion and the outer edge of the removable inner portion are of plastic material, there is no risk of cutting.

Said breaking line preferably comprises a groove provided on the outer or on the inner side of the lid, or a double groove formed of two opposite grooves, one groove being provided on the outer side and the other groove being provided on the inner side of the lid. Depending on the shape of the grove or double groove provided within the plastic annular portion, the ripping of the inner removable portion will be total when said groove or double groove follows a continuous, circular line. Alternatively, said groove or double groove may be interrupted or may be less deep in one tract, such that the inner removable portion remains partially attached to the outer rim portion.

In any case, once the can has been opened, the user may safely manipulate it.

As mentioned above, the present invention aims also to solve the problem of the can blasting when the user inadvertently omits to open the can lid before putting the same can onto a heating source.

In order to achieve also this aim, the can according to the present invention, comprises tearing means for discharging the inner pressure when the inner pressure exceeds a predetermined value, said tearing means being provided in the annular plastic part or in the removable lid inner portion, if made of plastic material, or in the outer rim portion, if made of plastic material, thereby preventing the can from blasting.

Preferably said tearing means comprise one or more thinner zones able to tear when the inner pressure exceeds said predetermined value.

In a preferred embodiment, the tearing means are obtained by conveniently reducing the thickness of one or more small zones within said plastic component or components, thus forming one or more membranes able to tear at a given can inner pressure. It has to be pointed out, however, that the tearing zone can corresponding totally or partially to the aforesaid breaking line, so that it has a double function, i.e. to allow the opening of the can lid and to provide safety tearing means.

Conveniently the aforesaid tearing means will be positioned and will have a shape such as to discharge the inner pressure in a direction substantially parallel to the can lid.

The invention will be more easily understood from the following description of some embodiments, given merely by way of example, of the can according to the present invention, taken in conjunction with the accompanying drawings, in which:

FIG. 1 is an axial cross-section of a first embodiment of a can according to the invention, in the condition in which it is supplied to the user;

FIG. 2 is a perspective view of the upper part of the can of FIG. 1;

Figure 3:
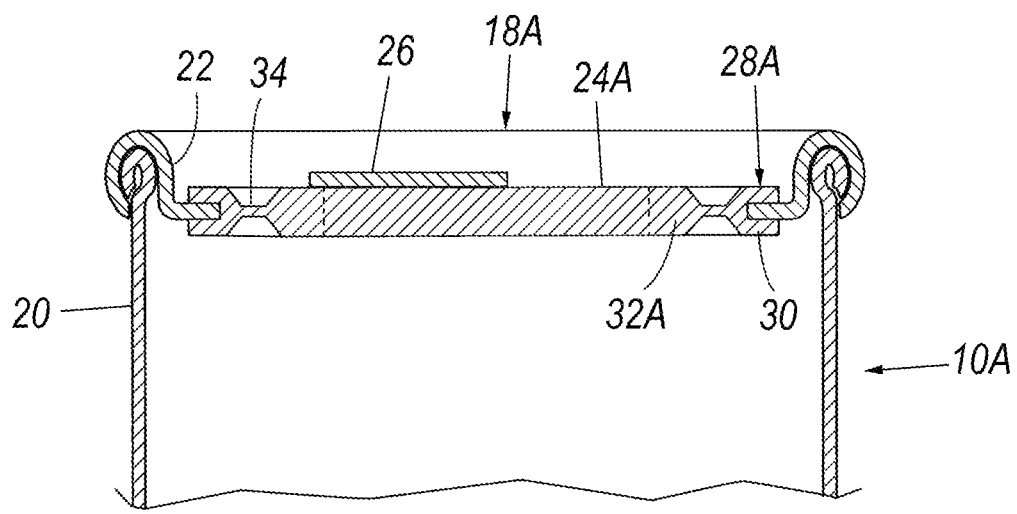
FIG. 3 is an axial cross-section of the upper part of a second embodiment of a can according to the invention.

As can be seen in FIG. 1, a can 10 comprises a first chamber 12 intended to collect the final beverage, a second chamber 14 containing a drinkable liquid, and a filtering device 16 containing a substance able to produce the required beverage by extraction and/or infusion. The can 10 is provided with a lid 18 which is seamed to the can vertical wall 20. The Lid 18 has an outer rim portion 22 intended to remain fixed to the can vertical wall 20 when opening the can 10, and an inner removable portion 24 intended to be ripped by pulling a conventional tab 26 in order to open the can 10. A plastic annular part 28 is interposed between the outer rim portion 22 and the inner removable portion 24, the outer side part 30 of said plastic annular part 28 being fixed to the inner perimeter of the outer rim portion 22 (part 30 being actually part of the rim portion 22) while the inner side part 32 of the annular portion 28 is fixed to the perimeter of the inner removable portion 24 (part 32 being actually part of the inner removable portion 24). A thinner zone or double grooves 34 is provided within the plastic annular portion 28, in which the resistance of the lid structure is reduced, the thinner zone separating said inner (32) and outer (30) side parts, thus enabling the hand-ripping (by means of the tab 26) of the aforesaid inner portion 24, 32. The plastic annular portion 28 is shaped (see FIG. 1) such as to be connected to the remaining portion of the lid (18).

Figure 4:
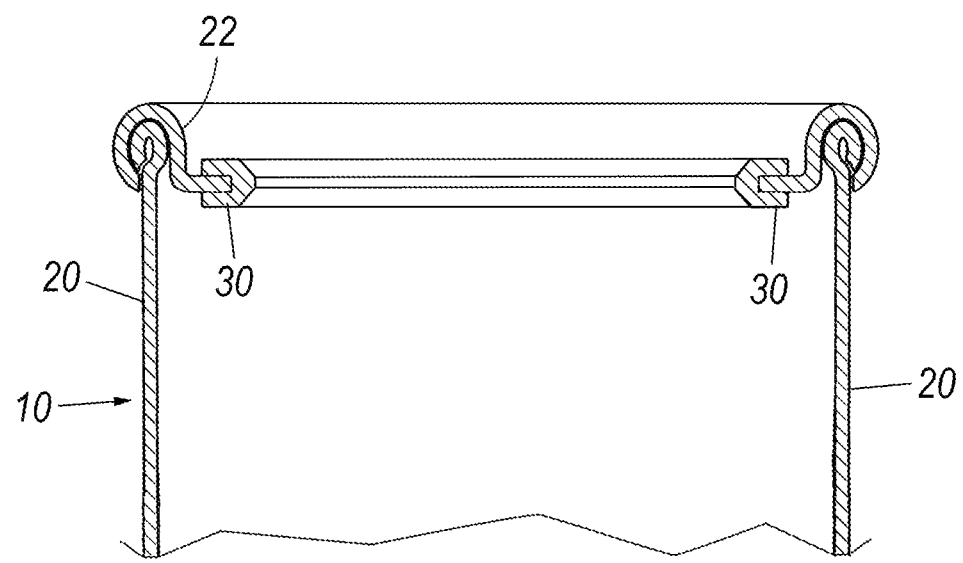
FIG. 4 shows the situation after removing the inner portion of the lid of the can of FIG. 3.

In the can 10A of FIG. 3 the inner removable portions 24A and 32A of the lid 18A are made of plastic material, are integral with the plastic annular portion 28A. A tab 26 is also provided. When the removable inner portions 24A and 32A have been ripped away by means of the tab 26, the can 10A appears to be open, as shown in FIG. 4.

Figure 5:
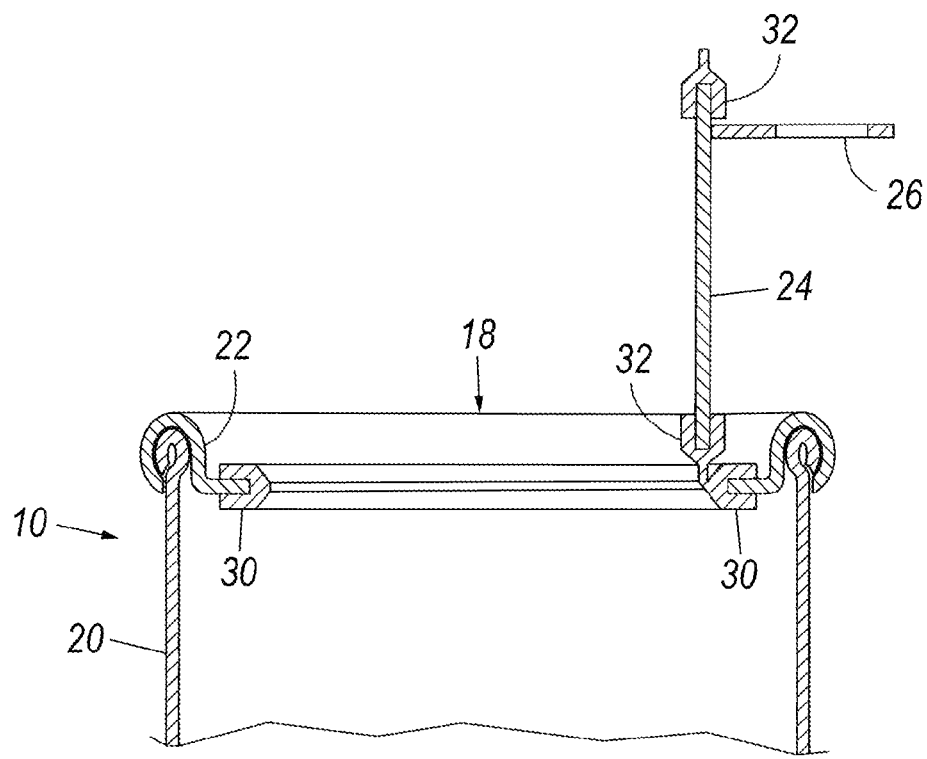
FIG. 5 is similar to FIG. 3, but with the inner removable portion of the lid only partially ripped and still partially attached to the outer rim portion of the lid.

Coming back to the can 10, it has to be pointed out that the removable inner portions 24, 32 can be only partially ripped away, so that the removable inner portions 24, 32 are still partially connected to the outer rim portions 22, 30 of the lid 18, as shown in FIG. 5.

Figure 6:
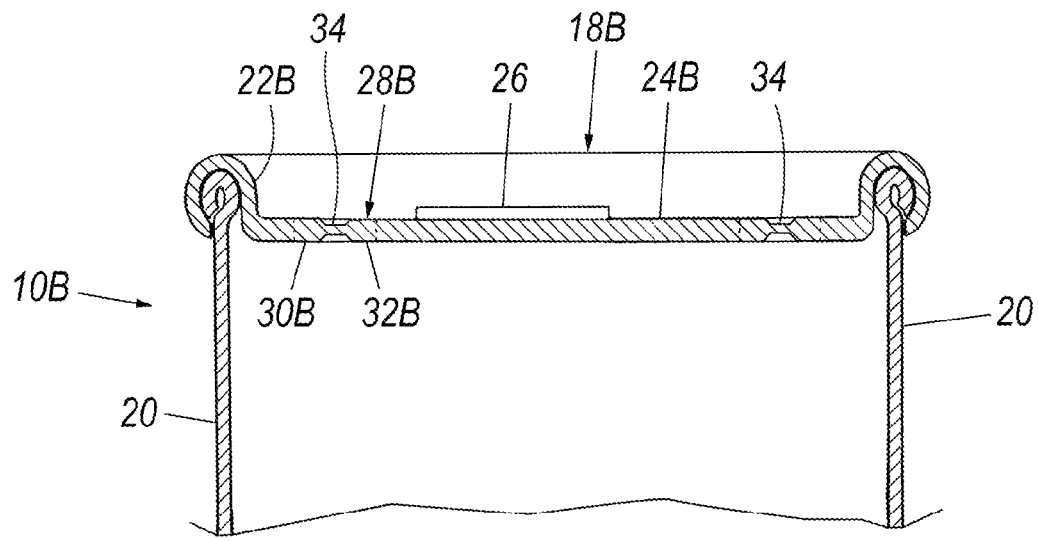
FIG. 6 shows another embodiment of the can according to the invention, in which the outer rim portion, the inner removable portion and the plastic annular portion are made in one piece of the same plastic material.

The can 10B shown in FIG. 6 has a lid 18B in one piece, the portions 22B, 28B and 24B thereof being consequently made of the same plastic material. In particular, the inner side part 32B of the annular portion 28B is integral with the remaining part (24B) of the removable inner portion (24B, 32B) whereas the outer side part 30B is integral with the remaining part (30B) of the outer rim portions (22B; 30B).

Figure 7:
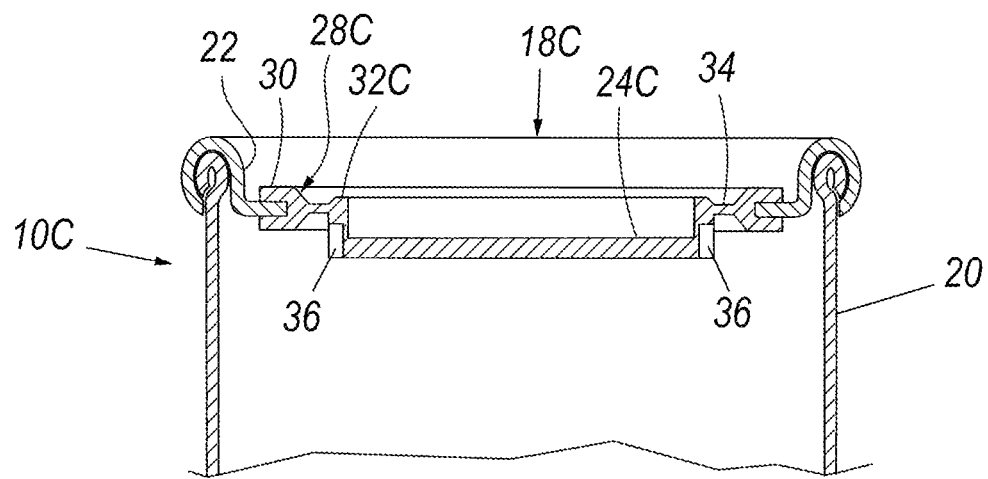
FIG. 7 shows a further embodiment in which the inner removable portion and the annular portion are made in one piece of plastic material, the annular portion comprising ripping means.
Figure 8:
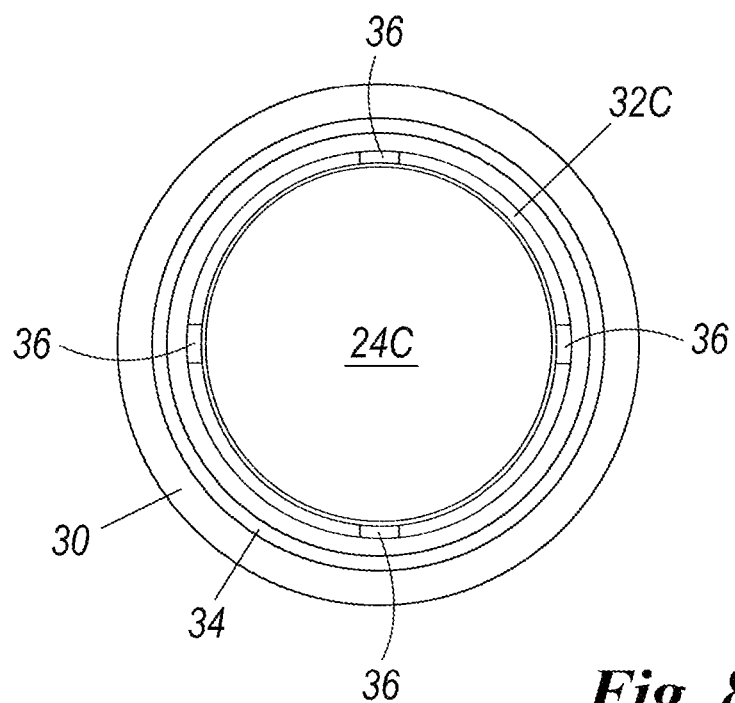
FIG. 8 is a view from the bottom of only the one piece of FIG. 7, comprising the inner portion, the removable portion and the ripping means.

The can 10C in FIG. 7 is similar to the can 10A in FIG. 3, with the difference that the lid 18C is provided with the above mentioned tearing means comprising, in the specific case, four thinner zones 36 (see also FIG. 8) which tears when the pressure in the can 10C exceeds a predetermined value. It has to be pointed out that when the discharge jets through zones 36 tear, they are directed substantially parallel to the bottom of the inner removable portion 24C.

It should be evident that tearing zones can be provided also in the plastic portions (28; 28A, 24A; 22B, 28B24B respectively) of other cans (10; 10A; 10B respectively) disclosed above. In particular the groove 34 itself can be a tearing means.

The invention claimed is:

1. A can for extemporaneous preparation of beverages by at least one of extraction and infusion, comprising:
    a lid;
    a first chamber configured to collect a final beverage;
    a second chamber containing a drinkable liquid;
    a filtering device containing a substance to produce the final beverage by at least one of extraction and infusion, the can being configured to be put onto a heating source after opening the can lid and operating the filtering device by a user;
    the lid including:
        an outer rim portion configured to remain fixed to a lateral wall of the can when opening the can;
        an inner removable portion extending along a first plane and configured to be ripped to open the can;
        a predetermined breaking line separating the inner removable portion from the outer rim portion, wherein the breaking line is provided in an annular portion forming part of the lid and made of plastic material, an outer part of the annular portion being part of the outer rim portion while an inner part thereof being part of the inner removable portion; and
        a tearing part that discharges inner pressure when the inner pressure exceeds a predetermined value with the lid being still closed,
    the tearing part and the breaking line being at separate locations in the lid, and
    the tearing part is provided in at least one of the annular plastic part, the removable inner portion when the removable inner portion is made of plastic material, and the outer rim portion when the outer rim portion is made of plastic material, and
    the tearing part is obtained by reducing a thickness of one or more small zones of the plastic portions of the lid to form one or more thin membranes configured to break at a predetermined inner pressure in the can, and
    the tearing part is positioned and has a shape to discharge the can inner pressure in a direction substantially parallel to the first plane.

2. The can according to claim 1, wherein the tearing part is located in a vertical wall of the lid.

* * * * *